US008879448B2

(12) United States Patent
Sundaresan

(10) Patent No.: US 8,879,448 B2
(45) Date of Patent: Nov. 4, 2014

(54) APPARATUS FOR CONTROLLING POWER OF WIMEDIA MEDIA ACCESS CONTROL DEVICE AND METHOD USING THE SAME

(75) Inventor: Swaminathan Sundaresan, Chennai (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1551 days.

(21) Appl. No.: 11/964,069

(22) Filed: Dec. 26, 2007

(65) Prior Publication Data

US 2008/0151803 A1 Jun. 26, 2008

(30) Foreign Application Priority Data

Dec. 22, 2006 (IN) .......................... 2412/CHE/2006
Feb. 16, 2007 (KR) ........................ 10-2007-0016326

(51) Int. Cl.
*G01R 31/08* (2006.01)
*H04J 1/16* (2006.01)
*H04W 52/26* (2009.01)
*G06F 11/00* (2006.01)
*H04W 52/28* (2009.01)
*H04W 28/04* (2009.01)

(52) U.S. Cl.
CPC ............ *H04W 52/267* (2013.01); *H04W 52/28* (2013.01); *H04W 52/286* (2013.01); *H04W 28/04* (2013.01)
USPC ........................ 370/311; 370/236; 370/395.62

(58) Field of Classification Search
USPC .................................................. 370/350, 311
See application file for complete search history.

(56) References Cited

U.S. PATENT DOCUMENTS

| | | | |
|---|---|---|---|
| 6,567,416 B1 * | 5/2003 | Chuah | 370/418 |
| 7,197,025 B2 * | 3/2007 | Chuah | 370/338 |
| 7,257,095 B2 * | 8/2007 | Liu | 370/311 |
| 7,263,105 B2 * | 8/2007 | Trainin | 370/445 |
| 7,301,914 B2 * | 11/2007 | Segal et al. | 370/311 |
| 7,369,858 B2 * | 5/2008 | Backes et al. | 455/453 |
| 7,474,676 B2 * | 1/2009 | Tao et al. | 370/469 |
| 7,496,064 B2 * | 2/2009 | Kupershmidt | 370/321 |
| 7,496,076 B2 * | 2/2009 | Takagi et al. | 370/338 |
| 7,525,970 B2 * | 4/2009 | Mangin et al. | 370/395.21 |
| 7,537,167 B1 * | 5/2009 | Miller | 235/472.01 |
| 7,551,892 B1 * | 6/2009 | Elliott | 455/41.1 |

(Continued)

FOREIGN PATENT DOCUMENTS

| | | |
|---|---|---|
| JP | 2003-158481 A | 5/2003 |
| KR | 10-2005-0029381 A | 3/2005 |
| KR | 10-2005-0052849 A | 6/2005 |
| KR | 10-2006-0066904 A | 6/2006 |

OTHER PUBLICATIONS

Communication dated Jan. 30, 2013 issued by the Korean Patent Office in counterpart Korean Patent Application No. 10-2007-0016326.

*Primary Examiner* — Melvin H Pollack
(74) *Attorney, Agent, or Firm* — Sughrue Mion, PLLC

(57) ABSTRACT

An apparatus and method of controlling power of a wireless multimedia media access control (WiMedia MAC) device are provided. The method includes: determining whether a fragment of an MAC service data unit (MSDU) is lost when a fragment is received; extracting a duration field from the received fragment if it is determined that the fragment of the MSDU is lost; and converting a power mode into a low power mode during a period of time established in the duration field.

15 Claims, 5 Drawing Sheets

(56) References Cited

U.S. PATENT DOCUMENTS

| | | | |
|---|---|---|---|
| 7,558,557 B1* | 7/2009 | Gollnick et al. | 455/343.4 |
| 7,570,610 B2* | 8/2009 | Chen | 370/318 |
| 7,590,118 B2* | 9/2009 | Giesberts et al. | 370/392 |
| 7,613,156 B2* | 11/2009 | Rittle et al. | 370/338 |
| 7,630,333 B2* | 12/2009 | Bichot | 370/328 |
| 7,656,831 B2* | 2/2010 | Gao et al. | 370/311 |
| 7,680,118 B2* | 3/2010 | Zegers et al. | 370/394 |
| 7,702,371 B2* | 4/2010 | Edwards et al. | 455/574 |
| 7,706,338 B2* | 4/2010 | Kondylis et al. | 370/338 |
| 7,746,861 B2* | 6/2010 | Nishibayashi et al. | 370/392 |
| 7,756,101 B2* | 7/2010 | Tervonen et al. | 370/348 |
| 7,757,956 B2* | 7/2010 | Koenck et al. | 235/472.01 |
| 7,764,648 B2* | 7/2010 | Gopinath et al. | 370/329 |
| 7,801,043 B2* | 9/2010 | Ali et al. | 370/235 |
| 7,813,307 B2* | 10/2010 | Kakani | 370/311 |
| 7,826,431 B2* | 11/2010 | Cave et al. | 370/338 |
| 7,826,485 B2* | 11/2010 | Ho et al. | 370/473 |
| 7,826,818 B2* | 11/2010 | Gollnick et al. | 455/343.4 |
| 7,855,999 B2* | 12/2010 | Lindskog et al. | 370/338 |
| 7,860,043 B2* | 12/2010 | Chen | 370/318 |
| 7,869,822 B2* | 1/2011 | Backes et al. | 455/522 |
| 7,876,896 B2* | 1/2011 | Alkove et al. | 380/37 |
| 7,885,680 B2* | 2/2011 | Larsson | 455/522 |
| 7,912,026 B2* | 3/2011 | Sugar et al. | 370/338 |
| 7,920,504 B2* | 4/2011 | Muqattash et al. | 370/318 |
| 7,924,805 B2* | 4/2011 | Nishibayashi et al. | 370/346 |
| 7,924,841 B2* | 4/2011 | Tzannes et al. | 370/392 |
| 7,948,911 B2* | 5/2011 | Larsson | 370/252 |
| 8,014,370 B2* | 9/2011 | Banerjea et al. | 370/338 |
| 8,014,748 B2* | 9/2011 | Shi et al. | 455/343.1 |
| 8,014,832 B1* | 9/2011 | Garrabrant et al. | 455/574 |
| 8,045,494 B2* | 10/2011 | Habetha et al. | 370/311 |
| 8,045,631 B2* | 10/2011 | Huang et al. | 375/260 |
| 8,134,942 B2* | 3/2012 | Messinger et al. | 370/311 |
| 8,135,427 B2* | 3/2012 | Muqattash et al. | 455/522 |
| 8,199,686 B1* | 6/2012 | Donovan | 370/311 |
| 8,274,992 B2* | 9/2012 | Nishibayashi et al. | 370/447 |
| 8,432,888 B2* | 4/2013 | Sakoda et al. | 370/349 |
| 8,467,837 B2* | 6/2013 | Matson et al. | 455/574 |
| RE44,435 E * | 8/2013 | Jeong et al. | 370/252 |
| 8,543,174 B2* | 9/2013 | Salomone et al. | 455/574 |
| 8,639,257 B2* | 1/2014 | Sammour et al. | 455/450 |
| 8,660,617 B1* | 2/2014 | Banerjea et al. | 455/574 |
| 2004/0095964 A1 | 5/2004 | Meylan et al. | |
| 2005/0165950 A1 | 7/2005 | Takagi et al. | |
| 2005/0216776 A1* | 9/2005 | Watanabe | 713/300 |
| 2005/0249183 A1* | 11/2005 | Danon et al. | 370/347 |
| 2005/0270977 A1* | 12/2005 | King et al. | 370/235 |
| 2006/0034274 A1* | 2/2006 | Kakani et al. | 370/389 |
| 2006/0045035 A1* | 3/2006 | Liu | 370/311 |
| 2006/0104300 A1* | 5/2006 | Ho | 370/428 |
| 2006/0126847 A1* | 6/2006 | Ho | 380/277 |
| 2006/0165028 A1 | 7/2006 | Hiraki et al. | |
| 2007/0076742 A1* | 4/2007 | Du et al. | 370/445 |
| 2007/0127373 A1* | 6/2007 | Ho et al. | 370/229 |
| 2007/0147284 A1* | 6/2007 | Sammour et al. | 370/328 |
| 2007/0160027 A1* | 7/2007 | Muqattash et al. | 370/347 |
| 2008/0137577 A1* | 6/2008 | Habetha | 370/311 |
| 2008/0232286 A1* | 9/2008 | Habetha et al. | 370/311 |
| 2009/0010210 A1* | 1/2009 | Hiertz et al. | 370/329 |
| 2009/0285189 A1* | 11/2009 | Kim et al. | 370/338 |
| 2009/0298555 A1* | 12/2009 | Matson et al. | 455/574 |
| 2009/0310573 A1* | 12/2009 | Sim et al. | 370/336 |
| 2010/0165925 A1* | 7/2010 | Del Prado Pavon et al. | 370/329 |
| 2011/0019750 A1* | 1/2011 | Ho et al. | 375/259 |
| 2011/0044164 A1* | 2/2011 | Bennett et al. | 370/221 |
| 2011/0149822 A1* | 6/2011 | Sammour et al. | 370/311 |
| 2012/0230349 A1* | 9/2012 | Sakoda | 370/445 |
| 2013/0115908 A1* | 5/2013 | Karaoguz | 455/343.2 |
| 2013/0287044 A1* | 10/2013 | Ho et al. | 370/474 |

* cited by examiner

APPARATUS FOR CONTROLLING POWER OF WIMEDIA MEDIA ACCESS CONTROL DEVICE AND METHOD USING THE SAME

CROSS-REFERENCE TO RELATED APPLICATIONS

This application claims priority from Indian Patent Application No. 2412/CHE/2006, filed on Dec. 22, 2006 in the Indian Patent Office, and Korean Patent Application No. 10-2007-0016326, filed on Feb. 16, 2007 in the Korean Intellectual Property Office, the entire disclosures of which are incorporated herein by reference.

BACKGROUND OF THE INVENTION

1. Field of the Invention

Methods and apparatuses consistent with the present invention relate to controlling power of a wireless multimedia media access control (WiMedia MAC) device, and more particularly, to controlling power of a WiMedia MAC device, which can reduce unnecessary power consumption in a receiving WiMedia MAC device.

2. Description of Related Art

A power mode of a WiMedia MAC device includes a hibernation mode having a little power consumption, and an active mode having greater power consumption than the power consumption of the hibernation mode.

Generally, the WiMedia MAC device is operated in an active mode when receiving a fragment of an MAC service data unit (MSDU) transmitted from a transmitting WiMedia MAC device.

The WiMedia MAC device operated in a no acknowledgment (No-ACK) mode does not receive a corresponding MSDU when the fragment of the MSDU transmitted from the transmitting WiMedia MAC device is lost.

However, even when the WiMedia MAC device cannot find a fragment number of the MSDU transmitted from the transmitting WiMedia MAC device, the WiMedia MAC device must maintain a power mode as an active mode for a period of time required for transmitting the MSDU despite the fact that the fragment of the MSDU is not received.

Specifically, unnecessary power consumption occurs since the WiMedia MAC device must maintain the power mode as the active mode during the period of time required for transmitting the MSDU when the fragment of the MSDU is lost.

Therefore, an apparatus, by which a transmitting WiMedia MAC device can transmit information with respect to a period of time required for transmitting an MSDU, and a receiving WiMedia MAC device can control a power mode when a fragment of the MSDU is lost, is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method of controlling power of a WiMedia MAC device, which can reduce unnecessary power consumption of the WiMedia MAC device when a fragment of an MSDU is lost.

The present invention also provides an apparatus and method of controlling power of a WiMedia MAC device, which can reduce unnecessary power consumption of the WiMedia MAC device, based on time information established in a transmitting WiMedia MAC device when a fragment of an MSDU is lost.

The present invention also provides an apparatus and method of controlling power of a WiMedia MAC device, which can reduce unnecessary power consumption in an active mode of the WiMedia MAC device, when a fragment of an MSDU is lost.

According to an aspect of the present invention, there is provided a method of controlling power of a WiMedia MAC device, the method including: determining whether a fragment of an MSDU is lost when receiving a fragment; extracting a duration field from the received fragment if the fragment of the MSDU is lost; and converting a power mode into a predetermined low power mode during a period of time established in the duration field.

The determining of whether the fragment is lost may include comparing a sequence number of the received fragment and a sequence number of an expected fragment, and determining that the fragment of the MSDU is lost if the sequence number of the received fragment is greater than the sequence number of the expected fragment.

The sequence number includes an MSDU identifier and a fragment number, and the determining of whether the fragment is lost comprises comparing a fragment number of the received fragment and a fragment number of the expected fragment when the MSDU identifier of the sequence number of the received fragment, and the MSDU identifier of the sequence number of the expected fragment are identical, and determining that the fragment of the MSDU is lost when the fragment number of the received fragment is greater than the fragment number of the expected fragment.

The method may be applied to a WiMedia MAC device operated in a no acknowledgment (No-ACK) mode.

The period of time established in the duration field may correspond to a period of time from the received fragment to a final fragment of the MSDU.

The method may further include converting the low power mode into an active mode after the period of time established in the duration field.

The method may be applied to either a prioritized contention access (PCA) method, or a distributed reservation protocol (DRP) method.

The low power mode may correspond to either an idle mode or a sleep mode.

According to another aspect of the present invention, there is provided an apparatus for controlling power of a WiMedia MAC device, the apparatus including: a loss determiner which determines whether a fragment of an MSDU is lost when receiving a fragment; a duration field extractor which extracts a duration field from the received fragment if the fragment of the MSDU is lost; and a power mode converter which converts a power mode into a predetermined low power mode during a period of time established in the duration field.

The loss determiner may compare a sequence number of the received fragment, and a sequence number of an expected fragment, and determine that the fragment of the MSDU is lost when the sequence number of the received fragment is greater than the sequence number of the expected fragment.

The apparatus may be operated in a No-ACK mode.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Figure 1:
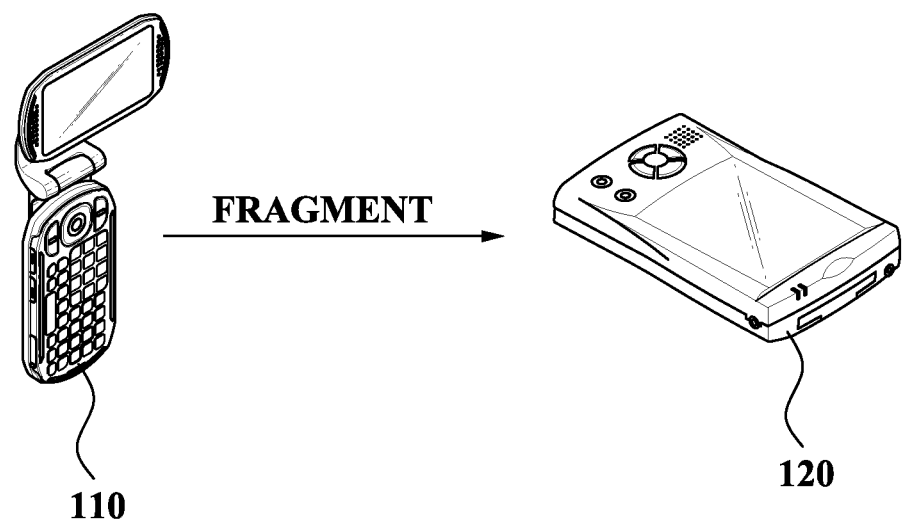
FIG. 1 is a system diagram illustrating an apparatus for controlling power of a WiMedia MAC device according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a system diagram illustrating an apparatus for controlling power of a wireless multimedia media access control (WiMedia MAC) device according to an exemplary embodiment of the present invention.

Referring to FIG. 1, a system includes a transmitting WiMedia MAC device 110 and a receiving WiMedia MAC device 120. Here, the transmitting WiMedia MAC device 110 and the receiving WiMedia MAC device 120 are operated in a No-ACK mode.

The transmitting WiMedia MAC device 110 divides an MSDU into a predetermined number of fragments, and transmits the MSDU to the receiving WiMedia MAC device 120.

In this instance, the transmitting WiMedia MAC device 110 and the receiving WiMedia MAC device 120 may transceive a fragment of the MSDU in either a prioritized contention access (PCA) method, or a distributed reservation protocol (DRP) method.

In this instance, the transmitting WiMedia MAC device 110 may transmit the fragment of the MSDU to the receiving WiMedia MAC device 120 including a sequence number of the fragment in an MAC header.

Here, the sequence number includes an MSDU identifier and a fragment number. The MSDU identifier corresponds to a component for identifying the MSDU, and the fragment number corresponds to a component for checking a sequence of the divided fragments of the MSDU.

In this instance, the fragment of the MSDU transmitted from the transmitting WiMedia MAC device 110 to the receiving WiMedia MAC device 120 may include a duration field in which a period of time from the transmitted fragment of the MSDU to a fragment of the MSDU having a final fragment number is established.

The receiving WiMedia MAC device 120 receives the fragment of the MSDU transmitted from the transmitting WiMedia MAC device 110, and determines whether the fragment of the MSDU is lost, based on the sequence number of the received fragment of the MSDU, and the sequence number of the expected fragment.

In this instance, the receiving WiMedia MAC device 120 may determine that the fragment of the MSDU is lost when the fragment number of the received fragment is greater than the fragment number of the expected fragment.

The receiving WiMedia MAC device 120 extracts the duration field included in the received fragment of the MSDU when the fragment of the MSDU is lost, checks the period of time from the fragment received from the duration field to a final fragment of the MSDU, and converts an active mode into a predetermined low power mode during the period of time.

In this instance, the low power mode corresponds to either an idle mode or a sleep mode.

Figure 2:
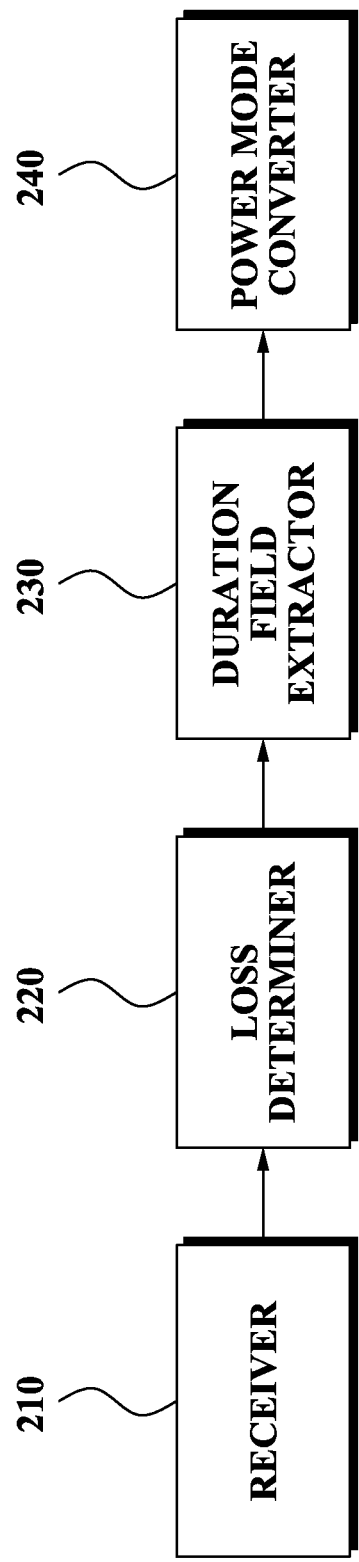
FIG. 2 is a block diagram illustrating a configuration of an apparatus for controlling power of a WiMedia MAC device according to an exemplary embodiment of the present invention.

FIG. 2 is a block diagram illustrating a configuration of an apparatus for controlling power of a WiMedia MAC device according to an exemplary embodiment of the present invention.

Referring to FIG. 2, the apparatus for controlling power of the WiMedia MAC device includes a receiver 210, a loss determiner 220, a duration field extractor 230, and a power mode converter 240.

The receiver 210 receives a fragment of an MSDU transmitted from a transmitting WiMedia MAC device.

The loss determiner 220 determines whether the fragment of the MSDU is lost when the fragment of the MSDU is received.

In this instance, the loss determiner 220 may determine whether the fragment of the MSDU is lost, based on a sequence number of the received fragment of the MSDU, and a sequence number of an expected fragment.

Specifically, the loss determiner 220 compares an MSDU identifier of the received fragment of the MSDU, and an MSDU identifier of the expected fragment, and determines whether the fragment of the MSDU is lost, based on the fragment number of the received fragment of the MSDU, and the fragment number of the expected fragment when two MSDU identifiers are identical.

In this instance, the loss determiner 220 may determine that the fragment of the MSDU is lost when it is determined that the fragment number of the received fragment is greater than the fragment number of the expected fragment.

The duration field extractor 230 extracts a duration field from the received fragment of the MSDU when the fragment of the MSDU is lost.

In this instance, the duration field may include a period of time established from the received fragment of the MSDU to a final fragment of the MSDU.

The power mode converter 240 converts an active mode of the WiMedia MAC device into a low power mode during a period of time established in the extracted duration field.

In this instance, the low power mode corresponds to either an idle mode or a sleep mode.

The power mode converter 240 converts the low power mode of the WiMedia MAC device into the active mode after the fragment of the MSDU is received, and subsequently the period of time established in the duration field has passed.

Specifically, the WiMedia MAC device may convert the active mode into the low power mode during the period of time in which the transmitting WiMedia MAC device transmits remaining fragments of the MSDU in which the fragment is lost, thereby reducing unnecessary power consumption.

Figure 3:
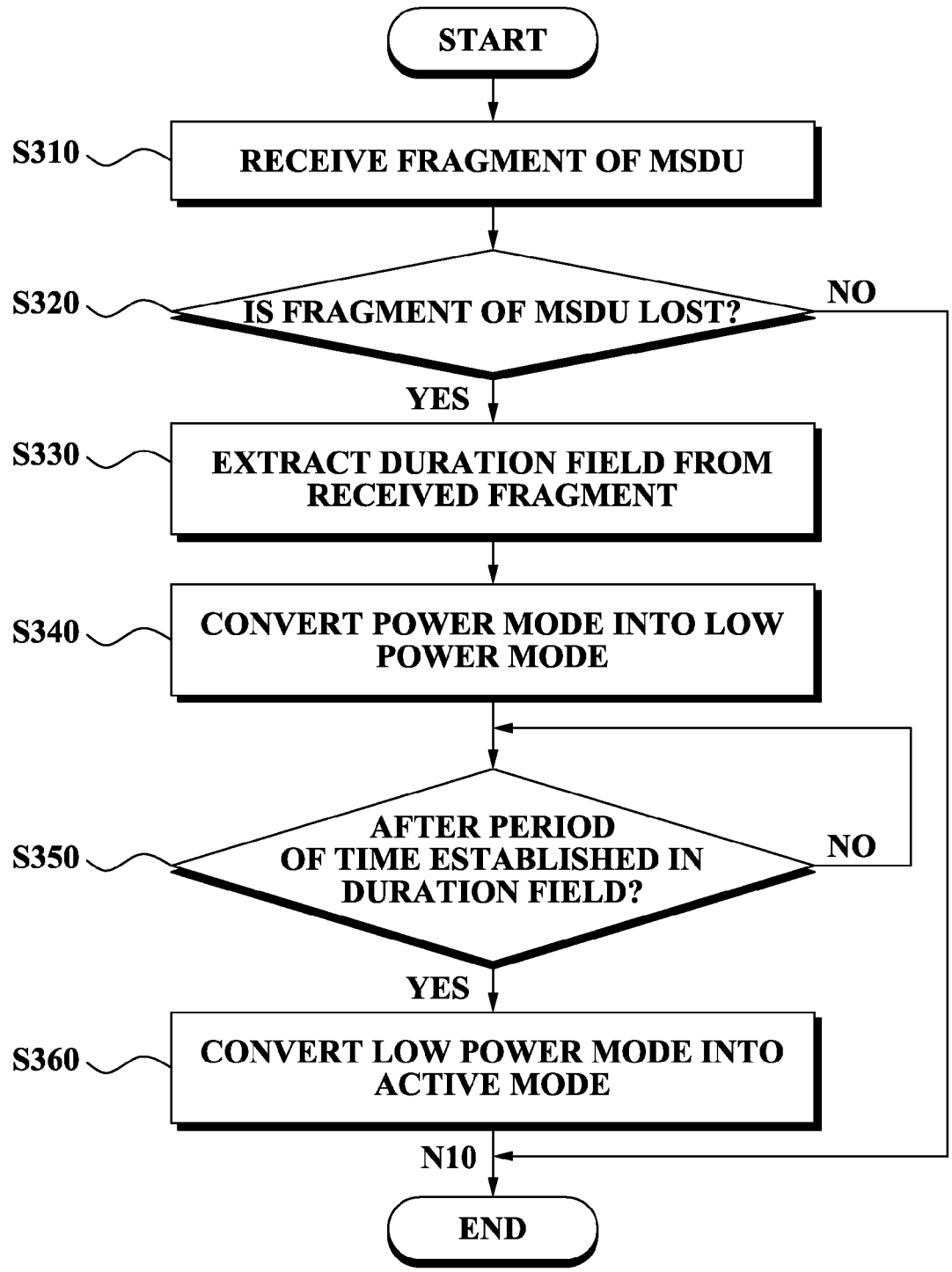
FIG. 3 is a flowchart illustrating an operation of a method of controlling power of a WiMedia MAC device according to an exemplary embodiment of the present invention.

FIG. 3 is a flowchart illustrating an operation of a method of controlling power of a WiMedia MAC device according to an exemplary embodiment of the present invention.

Referring to FIG. 3, the method of controlling power of the WiMedia MAC device receives a fragment of an MSDU transmitted from a transmitting WiMedia MAC device, in operation S310.

The WiMedia MAC device determines whether the fragment of the MSDU is lost when the fragment of the MSDU is received, in operation S320.

Specifically, the WiMedia MAC device determines whether the fragment of the MSDU transmitted from the transmitting WiMedia MAC device exists in an interval between the previously-received fragment of the MSDU, and the currently-received fragment of the MSDU when receiving the fragment of the MSDU.

In this instance, the WiMedia MAC device may determine whether the fragment of the MSDU is lost, based on a sequence number of the received fragment of the MSDU, and a sequence number of an expected fragment.

Here, the sequence number includes an MSDU identifier and a fragment number.

Specifically, the WiMedia MAC device compares the MSDU identifier of the received fragment of the MSDU, and the MSDU identifier of the expected fragment, and determines whether the fragment of the MSDU is lost, based on the fragment number of the received fragment of the MSDU, and the fragment number of the expected fragment when two MSDU identifiers are identical.

If it is determined that the fragment of the MSDU is lost in operation S320, the WiMedia MAC device extracts a duration field from the received fragment of the MSDU in operation S330.

Here, the duration field corresponds to a field in which a period of time from the received fragment of the MSDU to a final fragment of the MSDU having an identical MSDU identifier is established.

The WiMedia MAC device converts an active mode into a low power mode during the period of time established in the duration field when the duration field is extracted, in operation S340.

In this instance, the low power mode corresponds to either an idle mode or a sleep mode.

The WiMedia MAC device determines whether it is after the period of time established in the duration field, in operation S350, and if so, converts the low power mode into the active mode again after the period of time established in the duration field, in operation S360.

Specifically, the WiMedia MAC device reduces power consumption by converting a power mode into the low power mode during the period of time of transmitting the MSDU having the lost fragment, and converts the power mode into the active mode in order to receive the subsequent MSDU after transmitting the MSDU having the lost fragment.

The method of controlling power of the WiMedia MAC device according to the present invention, which performs the above-described process, may be applied to a WiMedia MAC device operated in a No-ACK mode.

Also, the method of controlling power of a WiMedia MAC device according to the present invention may be applied to either a PCA method or a DRP method.

Figure 4:
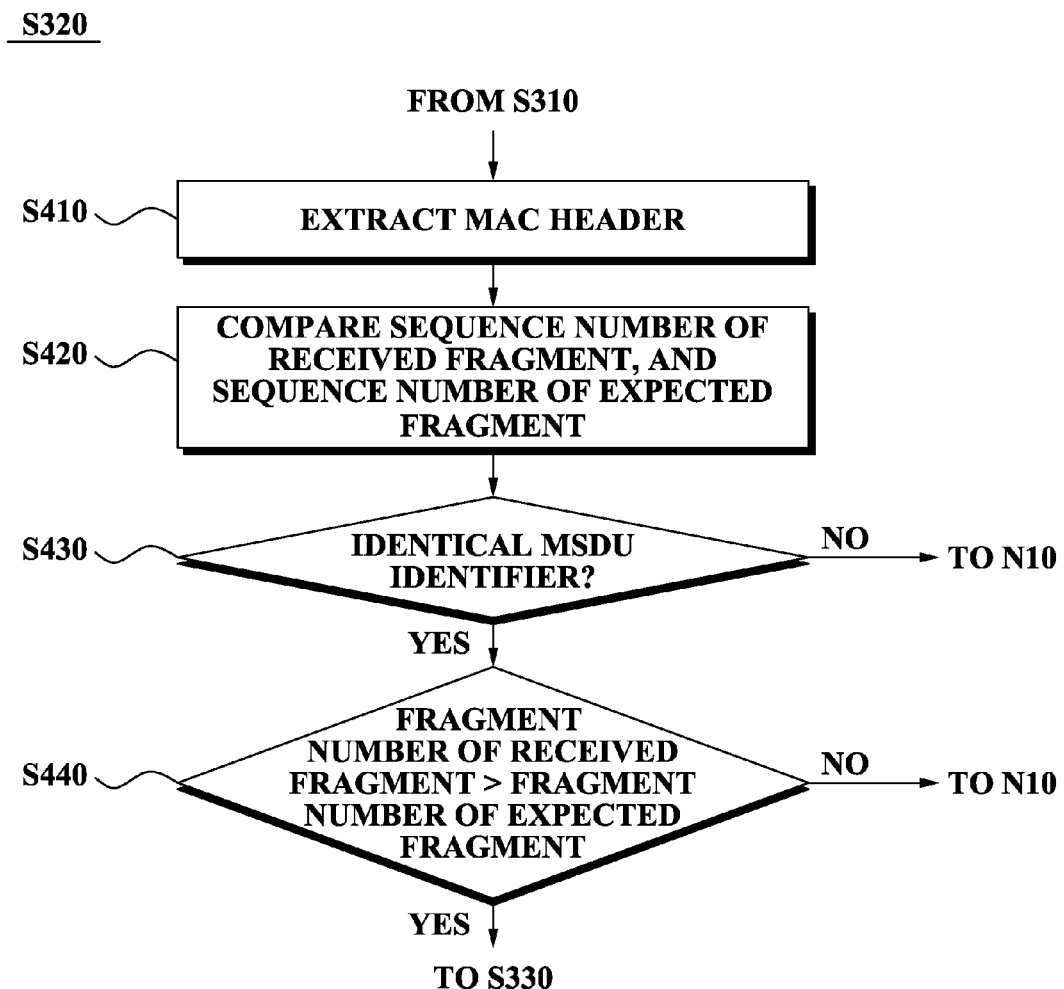
FIG. 4 is a flowchart illustrating operation S320 of FIG. 3 in detail.

FIG. 4 is a flowchart illustrating operation S320 of FIG. 3 in detail.

Referring to FIG. 4, the determining of whether the fragment is lost extracts an MAC header from a received fragment of an MSDU, in operation S410.

A WiMedia MAC device compares a sequence number of the fragment included in the MAC header, and a sequence number of an expected fragment which is due to be received by the WiMedia MAC device, in operation S420.

Here, the sequence number includes an MSDU identifier and a fragment number.

The WiMedia MAC device compares an MSDU identifier of the received fragment of the MSDU, and an MSDU identifier of the expected fragment, and determines whether two identifiers are identical, in operation S430.

Specifically, the WiMedia MAC device determines whether the previously-received fragment of the MSDU, and the currently-received fragment of the MSDU are fragments of the same MSDU.

As a result of the determining in operation S430, the WiMedia MAC device determines whether the fragment number of the received fragment of the MSDU is greater than the fragment number of the expected fragment when the MSDU identifier of the received fragment, and the MSDU identifier of the expected fragment are identical, in operation S440.

As a result of the determining in operation S440, the WiMedia MAC device determines that the fragment of the MSDU is lost when the fragment number of the received fragment of the MSDU is greater than the fragment number of the expected fragment.

The method of controlling power of the WiMedia MAC device according to the present invention is described in detail with reference to FIG. 5.

Figure 5:
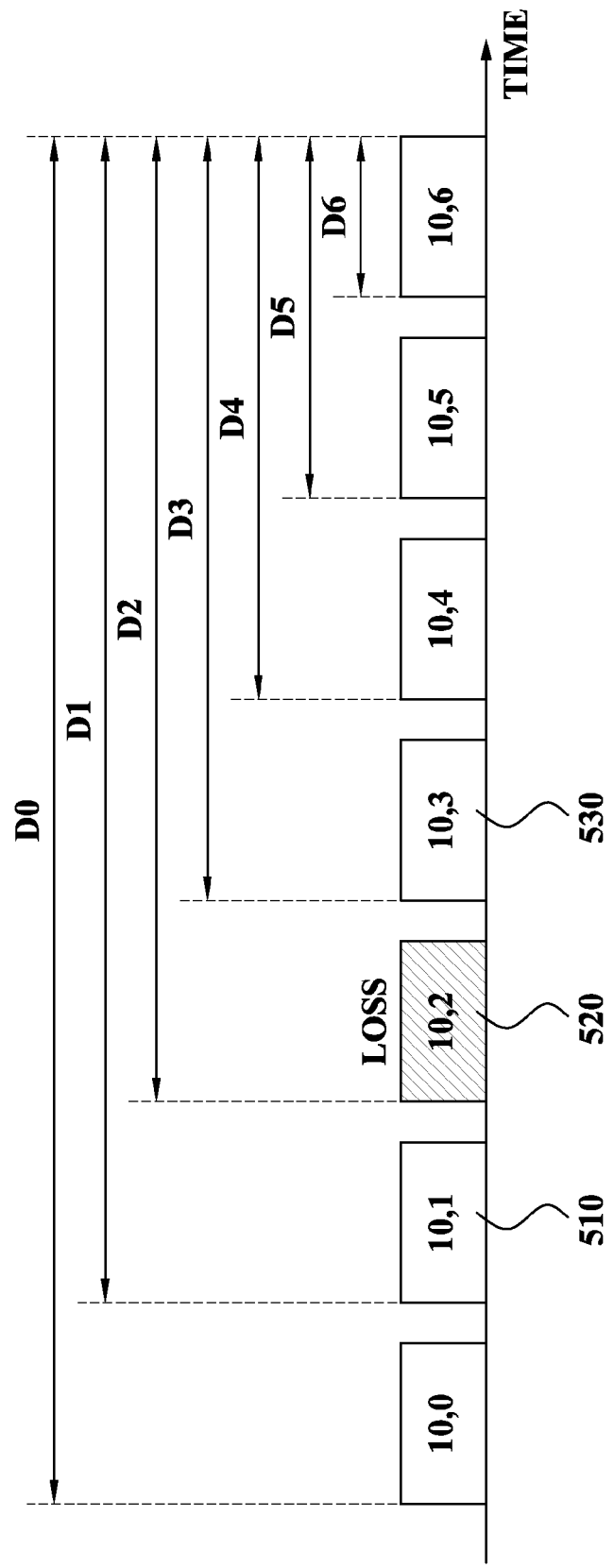
FIG. 5 is a diagram illustrating a method of controlling power of a WiMedia MAC device according to an exemplary embodiment of the present invention.

FIG. 5 is a diagram illustrating a method of controlling power of a WiMedia MAC device according to an exemplary embodiment of the present invention.

As illustrated in FIG. 5, an MSDU includes an MSDU identifier corresponding to ten (10), and is divided into seven fragments having a fragment number from zero to six (0-6).

Referring to FIG. 5, the WiMedia MAC device determines that the fragment of the MSDU is not lost since the fragment number of the received fragment is identical to the fragment number of the expected fragment up to a fragment in which the MSDU identifier and the fragment number of the fragment transmitted from the transmitting WiMedia MAC device correspond to ten and zero (10, 0), and a fragment 510 in which the MSDU identifier and the fragment number of the fragment transmitted from the transmitting WiMedia MAC device correspond to ten and one (10, 1) by using the method of controlling power according to the present invention.

Conversely, the WiMedia MAC device receives a fragment 530 in which the MSDU identifier and the fragment number correspond to ten and three (10, 3), since a fragment 520 in which the MSDU identifier and the fragment number correspond to ten and two (10, 2) is lost.

Here, since the WiMedia MAC device receives up to the fragment in which the MSDU identifier and the fragment number correspond to ten and one (10, 1), the MSDU identifier and the fragment number corresponding to the sequence number of the expected fragment correspond to ten and two (10, 2).

The WiMedia MAC device extracts an MAC header from the received fragment 530 of the MSDU, and checks the sequence number of the received fragment of the MSDU from the MAC header.

The WiMedia MAC device determines whether the fragment of the MSDU is lost, based on the sequence number of the received fragment of the MSDU (10, 3), and the sequence number of the expected fragment (10, 2).

Since the fragment number of the received fragment of the MSDU "3" is greater than the fragment number of the expected fragment "2", the WiMedia MAC device determines that the fragment of the MSDU which includes the MSDU identifier corresponding to "10" is lost.

Since the fragment of the MSDU is lost, the WiMedia MAC device extracts a duration field from the received fragment of the MSDU, and checks time information D3 established in the duration field.

The WiMedia MAC device converts an active mode into a low power mode during the period of time D3, thereby reducing unnecessary power consumption.

The WiMedia MAC device converts the low power mode into the active mode again after the period of time D3 in order to receive the subsequent MSDU.

The method of controlling power of the WiMedia MAC device according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the exemplary embodiments of the present invention, there is provided an apparatus and method of controlling power of a WiMedia MAC device, which can reduce unnecessary power consumption of the WiMedia MAC device when a fragment of an MSDU is lost.

Also, according to the exemplary embodiments of the present invention, there is provided an apparatus and method of controlling power of a WiMedia MAC device, which can reduce unnecessary power consumption of the WiMedia MAC device, based on time information established in a transmitting WiMedia MAC device when a fragment of an MSDU is lost.

Also, according to the exemplary embodiments of the present invention, there is provided an apparatus and method of controlling power of a WiMedia MAC device, which can reduce unnecessary power consumption in an active mode of the WiMedia MAC device, when a fragment of an MSDU is lost.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of controlling power of a receiving wireless multimedia media access control (WiMedia MAC) device, the method comprising:
   determining whether a previous fragment of an MAC service data unit (MSDU) received by the receiving WiMedia MAC device is lost by the receiving WiMedia MAC device when a fragment is received by the receiving WiMedia MAC device;
   extracting a duration field from the received fragment if it is determined that the previous fragment of the MSDU is lost;
   converting a power mode of the receiving WiMedia MAC device into a low power mode during a period of time extracted from the duration field; and
   converting the low power mode of the receiving WiMedia MAC device into an active mode after the period of time extracted from the duration field,
   wherein the determining whether the previous fragment is lost comprises:
   comparing a sequence number of the received fragment and a sequence number of an expected fragment; and
   determining that the previous fragment of the MSDU is lost if the sequence number of the received fragment is greater than the sequence number of the expected fragment,
   wherein the period of time extracted from the duration field corresponds to a period of from when the received fragment is received by the receiving WiMedia MAC device to a period of time when a final fragment of the MSDU is received by the receiving WiMedia MAC device.

2. The method of claim 1, wherein each of the sequence number of the received fragment and the sequence number of the expected fragment comprises an MSDU identifier and a fragment number, and
   the determining whether the previous fragment is lost comprises:
   comparing a fragment number of the received fragment and a fragment number of the expected fragment if the MSDU identifier of the sequence number of the received fragment and the MSDU identifier of the sequence number of the expected fragment are identical; and
   determining that the previous fragment of the MSDU is lost if the fragment number of the received fragment is greater than the fragment number of the expected fragment.

3. The method of claim 1, wherein the method is applied to a WiMedia MAC device operated in a no acknowledgment mode.

4. The method of claim 1, wherein the method is applied to a prioritized contention access method.

5. The method of claim 1, wherein the method is applied to a distributed reservation protocol method.

6. The method of claim 1, wherein the low power mode corresponds to an idle mode.

7. The method of claim 1, wherein the low power mode corresponds to a sleep mode.

8. A non-transitory computer-readable recording medium storing a program for implementing a method of controlling power of a receiving wireless multimedia media access control (WiMedia MAC) device, the method comprising:
   determining whether a previous fragment of an MAC service data unit (MSDU) received by the receiving WiMedia MAC device is lost by the receiving WiMedia MAC device when a fragment is received by the receiving WiMedia MAC device;
   extracting a duration field from the received fragment if it is determined that the previous fragment of the MSDU is lost;
   converting a power mode of the receiving WiMedia MAC device into a low power mode during a period of time extracted from the duration field; and
   converting the low power mode of the receiving WiMedia MAC device into an active mode after the period of time extracted from the duration field, wherein the determining whether the previous fragment is lost comprises:
comparing a sequence number of the received fragment and a sequence number of an expected fragment; and
determining that the previous fragment of the MSDU is lost if the sequence number of the received fragment is greater than the sequence number of the expected fragment,
wherein the period of time extracted from the duration field corresponds to a period of time from when the received fragment is received by the receiving WiMedia MAC device to a period of time when a final fragment of the MSDU is received by the receiving WiMedia MAC device.

9. An apparatus for controlling power of a receiving wireless multimedia media access control (WiMedia MAC) device, the apparatus comprising:
a loss determiner which determines whether a previous fragment of an MAC service data unit (MSDU) received by the receiving WiMedia MAC device is lost by the receiving WiMedia MAC device when a fragment is received by the receiving WiMedia MAC device;
a duration field extractor which extracts a duration field from the received fragment if the loss determiner determines that the previous fragment of the MSDU is lost;
a power mode converter which converts a power mode of the receiving WiMedia MAC device into a low power mode during a period of time extracted from the duration field, and converts the low power mode of the receiving WiMedia MAC device into an active mode after the period of time extracted from the duration field,
wherein the loss determiner compares a sequence number of the received fragment and a sequence number of an expected fragment, and determines that the previous fragment of the MSDU is lost when the sequence number of the received fragment is greater than the sequence number of the expected fragment,
wherein the period of time extracted from the duration field corresponds to a period of time from when the received fragment is received by the receiving WiMedia MAC device to a period of time when a final fragment of the MSDU is received by the receiving WiMedia MAC device.

10. The apparatus of claim 9, wherein each of the sequence number of the received fragment and the sequence number of the expected fragment comprise an MSDU identifier and a fragment number, and
the loss determiner compares a fragment number of the received fragment and a fragment number of the expected fragment if the MSDU identifier of the sequence number of the received fragment and the MSDU identifier of the sequence number of the expected fragment are identical, and determines that the previous fragment of the MSDU is lost if the fragment number of the received fragment is greater than the fragment number of the expected fragment.

11. The apparatus of claim 9, wherein the apparatus is operated in a no acknowledgement mode.

12. The apparatus of claim 9, wherein the apparatus is operated in a prioritized contention access method.

13. The apparatus of claim 9, wherein the apparatus is operated in a distributed reservation protocol method.

14. The apparatus of claim 9, wherein the low power mode corresponds to an idle mode.

15. The apparatus of claim 9, wherein the low power mode corresponds to a sleep mode.

* * * * *